No. 796,994. PATENTED AUG. 15, 1905.
J. H. GAY.
HORSESHOE.
APPLICATION FILED JAN. 7, 1904.
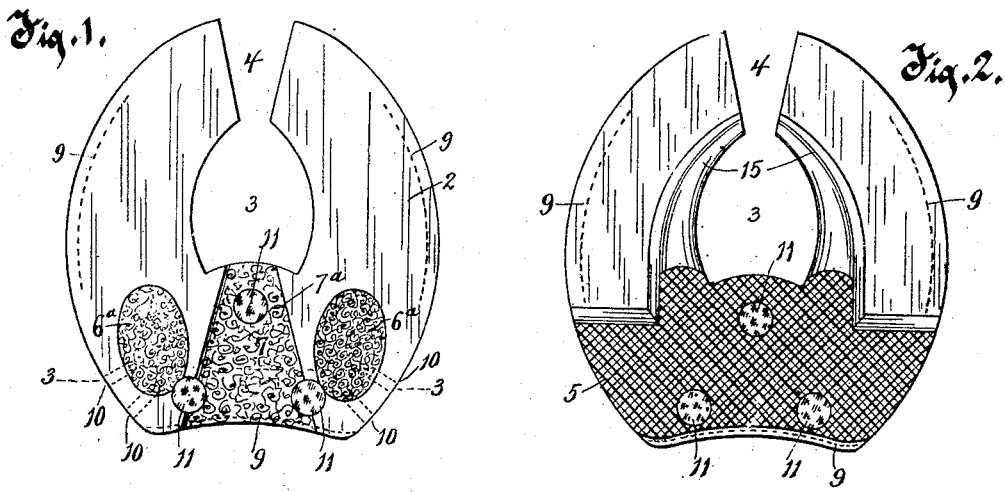
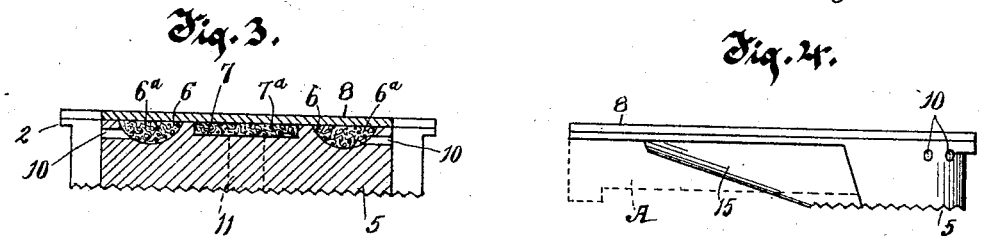
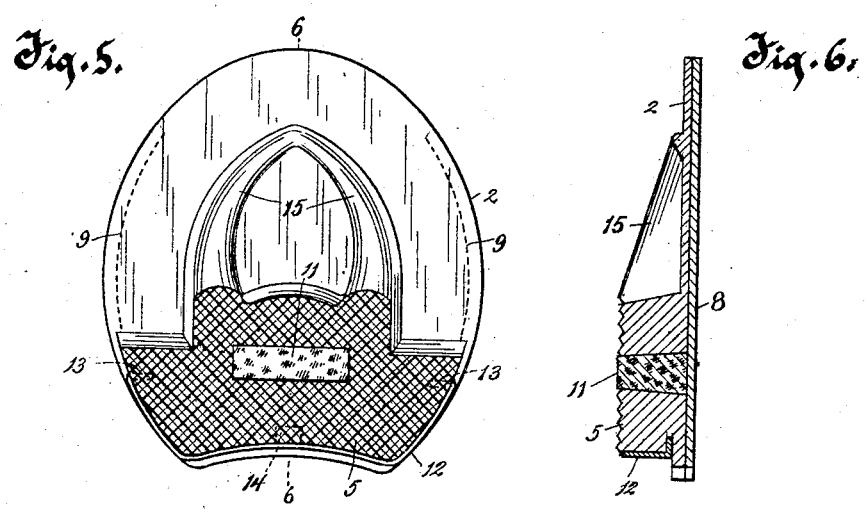
Witnesses.
Inventor.

UNITED STATES PATENT OFFICE.

JAMES H. GAY, OF MILWAUKEE, WISCONSIN.

HORSESHOE.

No. 796,994.　　　Specification of Letters Patent.　　　Patented Aug. 15, 1905.

Application filed January 7, 1904. Serial No. 188,002.

*To all whom it may concern:*

Be it known that I, JAMES H. GAY, residing at Milwaukee, in the county of Milwaukee and State of Wisconsin, have invented a new and useful Improvement in Horseshoes, of which the following is a description, reference being had to the accompanying drawings, which are a part of this specification.

My invention in horseshoes relates chiefly to a yielding pad which is employed with and in use becomes a part of the shoe or foot protection of the horse on which it is used.

The invention is directed to several improvements embodying novel features of benefit to the horse or advantages in the use thereof.

A feature of the invention is the providing of means for protecting or accommodating the shoe to the foot of a horse having corns thereon and providing a yielding or cushion-like construction for the bearing of the frog of the foot, also the providing of means in such yielding pad for preventing it from slipping on smooth pavements, and means for supporting the yielding pad along its edges against being broken down or wearing away with undue rapidity, and other minor features incidental to the foregoing principal features of the invention.

The invention consists, essentially, of the novel horseshoe-pad and its parts, as herein described and claimed or the equivalents thereof.

In the drawings, Figure 1 represents the inner or top surface of that portion of the flexible pad which is advisably made of hard rubber or analogous material and over which top surface represented in Fig. 1 the leather lining or cover is placed. Fig. 2 represents the under or outer side of the flexible or yielding pad shown in Fig. 1. Fig. 3 is a transverse section of the complete pad on line 3 3 of Fig. 1. Fig. 4 is an edge view of the complete pad, with which a so-called "half-length" shoe is indicated in dotted lines. Fig. 5 represents the under or outer surface of a pad in a slightly different form from that shown in Figs. 1, 2, and 3; and Fig. 6 is a longitudinal section centrally from front to rear of the form of pad shown in Fig. 5 along line 6 6 thereon.

My improved pad is intended to be used not only with what is called a "half-shoe" A, such as is indicated by dotted lines in Fig. 4, but also in such slightly-changed form as any horseshoer could make with what are termed "full shoes"—that is, steel shoes having their sides extending to the very extremity of the heel of the hoof of the horse.

The main or body part 2 of my improved pad is made of hard rubber or analogous yielding material and may be in lateral form a complete plate, as shown in Figs. 5 and 6, of the size and form of the hoof of a horse or may be cut away centrally at 3 and at the toe, as shown at 4 in Figs. 1 and 2. This body portion of the pad is comparatively thin at the front and middle portions thereof, while at the rear it has a thick and yielding heel-pad 5, extending across the pad and correspondingly across the hoof when in use, from side to side thereof. The under or outer surface of the thickened heel-pad is advisably roughened, as indicated in the drawings. On the top or inner surface of this body part of the pad, near the heel thereof, and at one or both sides thereof, near the lateral edges of the shoe, a pocket or pockets 6 on one or both sides of the shoe are provided, in which cork, felt, or some analogous suitable soft and yielding material $6^a$ is to be placed, forming a cushion for a corn or corns on the foot of the horse. These corn-pockets in the pad are located at one or both sides of the field of the frog on the foot of a horse—that is, near the heel and near the lateral edges of the pad, as these are the usual locations of corns. Also either in connection with the corn-cushions or independently thereof I provide a longitudinal recess or pocket 7, which may be tapering toward a point inwardly in the top surface of the heel of the pad, which is adapted to receive cork, felt, or other soft and yielding material $7^a$ as a cushion for the frog of the foot. Tar and oakum may be employed where the conditions of use would render them more desirable. Over this body part of the pad a leather or other flexible lining or cover 8 is placed, which cover is of the full size of the pad and the foot and is secured to the body part 2 of the pad by stitching 9 9 along near the edge thereof, or by cement, or partly by cement and partly by stitching, as may be deemed most desirable, in view of the conditions under which the pad when in use is to be employed.

In connection with the pockets 6 I advisably provide air-ducts 10 10 through the sides of the heel-pad to give ventilation thereto and also to serve as drainage therefor in case water gets into the pockets.

As the outer surface of the heel-pad is likely to wear smooth and become liable to slip, especially on smooth pavements when made of hard rubber, I provide friction devices 11 11, consisting, advisably, of cork, wood, or some similar suitable material, which are inserted in recesses or apertures therefor in and advisably passing through the yielding material or hard rubber of the heel-pad, so that they can be inserted from the top or inner side thereof and will extend through and give a bearing-surface at and flush with the outer surface of the hard-rubber heel. In the drawings I have shown two forms of these friction devices; but the form thereof is not material, except that they should be inserted firmly in the heel of the pad and should extend to and be exposed at the outer surface of the heel-pad and should be of such number or size as to give the necessary friction-bearing to prevent undue slipping of the pad on a pavement.

As the outer unsupported edges of the heel of the pad are liable to break down or quickly wear off, especially on stone or very hard pavements, I advisably provide for pads for such use a supporting band or margin 12, formed of a strap of steel bent to conform with the rear and adjacent side edges of the heel of the pad, which is fitted and secured thereto in such manner as to support the otherwise unsupported edges of the rubber pad. For conveniently securing this supporting-band to the pad the band is provided with terminal spurs 13 13 and may also have a medially-disposed tongue 14, which being turned inwardly enter the rubber and secure the supporting or reinforcing band to and about the edge of the heel of the pad.

The stiffening-ribs 15, extending forwardly from the heel of the pad on the outer surface thereof and alongside the inner edges of the steel shoe, may or may not be employed, as preferred.

In use on the foot of a horse the leather or flexible cover 8 and the corn-cushions 6ª, as also the same cover and the frog-cushion 7ª, will yield under the pressure of the corn or corns or the frog, respectively, thereon, so as not to cause pain or injury to the horse by the otherwise stiff and comparatively unyielding structure of the pad.

What I claim as my invention is—

1. A horseshoe-pad, comprising a body of yielding material having a thick heel portion and a thin front portion, the thick heel portion extending across the pad from side to side thereof and having a corn pocket or pockets in its upper surface near the heel, each pocket being independent of every other pocket or pockets and being wholly at the side of the field of the frog and between it and the edge of the pad, a yielding cushioning material other than air in the pocket or pockets, and a flexible cover over the body of the pad and pocket-cushion and secured to the body of the pad.

2. A horseshoe-pad, comprising a body of yielding material having a thick heel portion and a thin front portion, the thick heel portion extending across the pad from side to side thereof, and having a corn-pocket in the upper surface near the heel and independent of every other pocket and being wholly at the side of the field of the frog and between it and the edge of the pad, and an independent frog recess or pocket in the upper surface of the heel midway between the side edges thereof, and a yielding cushioning material other than air in the corn-pocket and in the frog-pocket, and a flexible cover over the body of the pad and the corn and frog cushions and secured to the body of the pad.

3. A hard-rubber horseshoe-pad, the heel portion of which at the rear of the metal shoe is thick, an exterior metal protecting-band fitted on and about the rear wall and adjacent portions of the side walls of the thick heel portion of the pad and at the rear and independently of the metal shoe and not inclosed thereby, and means on the band by which the band is secured directly to the pad.

4. In a horseshoe-pad, a hard-rubber body part having a thick heel, and a metal supporting-band on and about the rear and side edges of the rubber heel, said band having terminal and medial spurs engaging the rubber and securing the band to the heel.

5. In combination in a horseshoe-pad, a rubber body part having corn-cushion pockets and a frog-cushion recess, cushioning material in the pockets and recess, a friction device of cork or similar material inserted in and exposed at the outer surface of the heel of the pad, and a leather cover secured to the rubber body part on the inner surface thereof and over said cushion and said friction device.

In testimony whereof I affix my signature in presence of two witnesses.

JAMES H. GAY.

Witnesses:
C. T. BENEDICT,
ALMA KLUG.